United States Patent
McInerney

(10) Patent No.: US 6,727,923 B1
(45) Date of Patent: Apr. 27, 2004

(54) CREATION AND MANIPULATION OF INTERNET LOCATION OBJECTS IN A GRAPHICAL USER INTERFACE ENVIRONMENT

(75) Inventor: Peter Joseph McInerney, Cupertino, CA (US)

(73) Assignee: Apple Computer, Inc., Cupertino, CA (US)

(*) Notice: Subject to any disclaimer, the term of this patent is extended or adjusted under 35 U.S.C. 154(b) by 0 days.

(21) Appl. No.: 09/074,994

(22) Filed: May 8, 1998

(51) Int. Cl.$^7$ .............................................. G09G 5/00
(52) U.S. Cl. ......................... 345/847; 345/769; 719/316
(58) Field of Search ................................. 709/310–332, 709/219, 223, 245; 717/1–10; 345/716, 769, 847

(56) References Cited

U.S. PATENT DOCUMENTS

| | | | | |
|---|---|---|---|---|
| 5,717,877 A | * | 2/1998 | Orton et al. ................ | 345/860 |
| 5,724,595 A | * | 3/1998 | Gentner .................... | 715/501.1 |
| 5,737,560 A | | 4/1998 | Yohanan .................... | 395/349 |
| 5,890,172 A | * | 3/1999 | Borman et al. ............ | 715/501.1 |
| 5,896,533 A | * | 4/1999 | Ramos et al. .............. | 709/217 |
| 5,958,008 A | * | 9/1999 | Pogrebisky et al. ........ | 709/223 |
| 5,974,455 A | * | 10/1999 | Monier ..................... | 709/223 |
| 5,987,510 A | * | 11/1999 | Imai et al. ................. | 709/219 |
| 6,032,196 A | * | 2/2000 | Monier ..................... | 709/245 |
| 6,035,330 A | * | 3/2000 | Astiz et al. ................ | 709/218 |
| 6,041,324 A | * | 3/2000 | Earl et al. .................. | 707/9 |
| 6,091,409 A | * | 7/2000 | Dickman et al. ........... | 345/847 |
| 6,133,912 A | * | 10/2000 | Montero .................... | 345/716 |
| 6,138,150 A | * | 10/2000 | Nichols et al. ............. | 709/219 |
| 6,148,334 A | * | 11/2000 | Imai et al. ................. | 709/219 |
| 6,212,577 B1 | * | 4/2001 | Stern et al. ................ | 709/329 |
| 6,266,684 B1 | * | 7/2001 | Kraus et al. ............... | 715/513 |
| 6,460,058 B2 | * | 10/2002 | Koppolu et al. ........... | 345/738 |
| 6,470,383 B1 | * | 10/2002 | Leshem et al. ............. | 709/223 |

* cited by examiner

Primary Examiner—St. John Courtenay, III
(74) Attorney, Agent, or Firm—Burns, Doane, Swecker & Mathis, LLP

(57) ABSTRACT

Internet location objects are created and displayed as icons in a graphical user interface (GUI) environment. Internet location objects may be manipulated by the user in similar fashion as other GUI objects, e.g., files, folders, aliases, etc. When an object is dragged from within an application into a system window, a drag object describing what is being dragged in passed from the application to the operating system. An application may be aware of Internet location objects and, when an object is dragged from within the application into the system window, may specify that the object being dragged is a URL. Alternatively, the application may be unaware of or not support Internet locations but support generic text drag-and-drop, in which case the application, instead of specifying a "URL drag flavor," specifies a "text drag flavor" as part of the drag object. Depending on the drag flavor, the file manager either causes an Internet location object (URL drag flavor) to be created directly or intelligently parses a text string that has been dragged and dropped onto the user desktop to determine is the text string is likely a URL (text drag flavor). If a text string specified as part of a text flavor drag object is found to likely be a URL, then an Internet location object is created. Otherwise, a different behavior is followed, e.g., a "clipping" object or other object may be created. When the user "opens" an Internet location object, a browser or other assigned program is launched and retrieves the resource identified by the URL stored as part of the Internet location object. The resource may be located remotely or may be located on the local user machine. In particular, a URL can refer to resources that are not "on the net" (and which do not represent cached net resources). For example, URLs can be used to refer to files or directories on hard drives attached to a user machine independently of whether the machine is or has ever been attached to a network. URLs can thus serve a function very similar to aliases.

15 Claims, 4 Drawing Sheets

CREATION AND MANIPULATION OF INTERNET LOCATION OBJECTS IN A GRAPHICAL USER INTERFACE ENVIRONMENT

BACKGROUND OF THE INVENTION

1. Field of the Invention

The present invention relates to the retrieval of computer resources.

2. State of the Art

In the space of just a few years, the Internet has gone from being a buzzword to being an indispensable part of the way people work. Information is located on the Internet using Uniform Resource Locators, or URLs. The most familiar type of URL is the Web page address, e.g., www.company-.com. Many other types of URLs may also used, for example, network locations, FTP locations, news locations, e-mail addresses, file locations, network zones, etc. As the Internet has progressed from being a curiosity to being a heavily-used tool, a need has arisen for organizing URLs in such a way as to facilitate repeated access of an Internet resource. The most familiar way of organizing URLs is to simply ad URLs to a "favorites list," organized alphabetically. When an Internet resource is accessed and displayed under control of a Web browser, the user may select a command to add the URL of the resource to a menu-style favorites list. The URL itself may be displayed within the list, or a natural-language description of the resource may be displayed. To access the same resource again at a later time, the user may simply select the appropriate entry within the list.

Although a favorites list is very useful, it is a simple, fixed organizational scheme that can only become increasingly cumbersome with increased use. An alternative approach to organizing URLs is described in U.S. Pat. No. 5,737,560, incorporated herein by reference. This patent describes a "Web Jumper" software tool that may be used to create "jumpsites." A jumpsite is an iconographic representation of a URL. Doubling clicking on a jumpsite causes a Web browser to be activated to retrieve the resource specified by the URL. An options button allows a user to set a default Web browser and a default directory in which a jumpsite is stored. This solution, while providing a great improvement over conventional favorites lists, leave considerable room for improvement. In particular, because URLs are machine-intelligible but not necessarily machine intelligible, user interaction with URLs should not only avoid typing of URLs but should also be "forgiving" when a URL is incompletely specified. Furthermore, because the Internet is still rapidly evolving, flexibility should be preserved to use URLs in many different ways with potentially many different programs. What is needed, then, is a flexible user-driven method of creating and organizing URLs on a user machine.

SUMMARY OF THE INVENTION

The present invention, generally speaking, provides a flexible, user-driven method of creating and organizing URLs on a user machine. In one embodiment of the invention, Internet location objects are created and displayed as icons in a graphical user interface (GUI) environment. Internet location objects may be manipulated by the user in similar fashion as other GUI objects, e.g., files, folders, aliases, etc. The full organizational power of a hierarchical GUI file system is therefore brought to bear on the problem of organizing URLs. Internet location objects may be created through "drag-and-drop" manipulation of text. When an object is dragged from within an application into a system window, a drag object describing what is being dragged in passed from the application to the operating system. An application may be aware of Internet location objects and, when an object is dragged from within the application into the system window, may specify that the object being dragged is a URL. Alternatively, the application may be unaware of or not support Internet locations but support generic text drag-and-drop, in which case the application, instead of specifying a "URL drag flavor," specifies a "text drag flavor" as part of the drag object. Depending on the drag flavor, the file manager either causes an Internet location object (URL drag flavor) to be created directly or intelligently parses a text string that has been dragged and dropped onto the user desktop to determine is the text string is likely a URL (text drag flavor). If a text string specified as part of a text flavor drag object is found to likely be a URL, then an Internet location object is created. Otherwise, a different behavior is followed, e.g., a "clipping" object or other object may be created. Preferably, an icon used to represent an Internet location object is suggestive of the function of the Internet location object and is distinctively different from an icon used to represent a clipping object. When the user "opens" an Internet location object, a browser or other assigned program is launched and retrieves the resource identified by the URL stored as part of the Internet location object. The resource may be located remotely or may be located on the local user machine. In particular, a URL can refer to resources that are not "on the net" (and which do not represent cached net resources). For example, URLs can be used to refer to files or directories on hard drives attached to a user machine independently of whether the machine is or has ever been attached to a network. URLs can thus serve a function very similar to aliases.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 1:
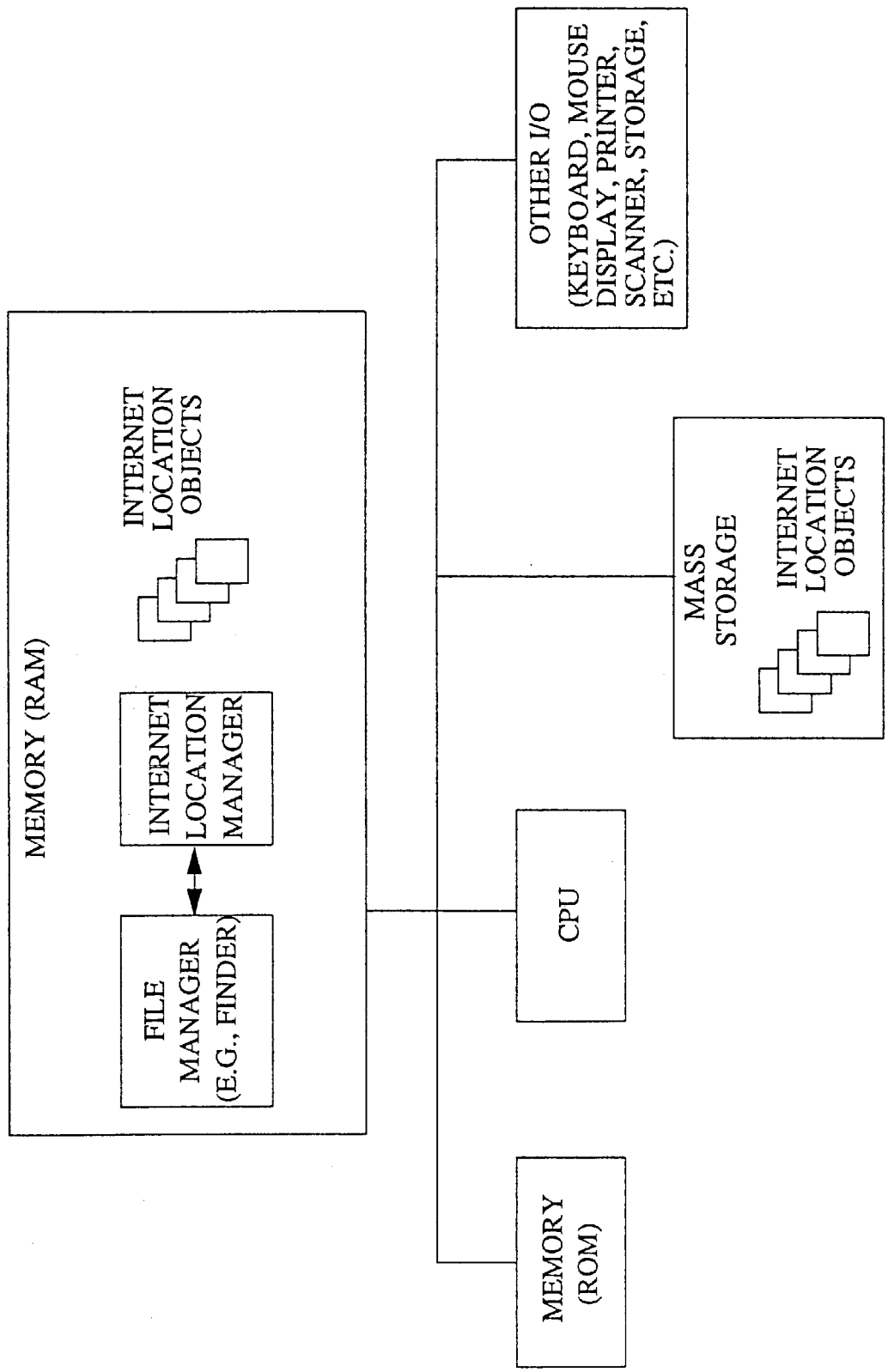
FIG. 1 is a block diagram showing a computer system within which the present invention may be used.

Referring now to FIG. 1, a block diagram is shown of a computer system within which the present invention may be used. Attached to a system bus are a CPU, read-only memory (ROM), read/write memory (RAM), mass storage, and other I/O devices. The other I/O devices typically include a keyboard, a pointing device and a display and may further include any of a wide variety of commercially available I/O devices including, for example, magnetic storage devices (e.g., floppy disk drive), optical storage devices (CD, VCD, DVD, MO, etc.), other storage devices (e.g., card readers or read/write devices), printers, scanners, cameras, speakers, etc.

Read/write memory includes a system portion and a user portion. The system portion is used by the computer operating system and includes various operating system components of which only two are illustrated as being of particular interest for purposes of the present invention, namely a file manager and an Internet locations manager. The term "file manager" is used generically to refer to a GUI component that allows for the creation of data objects, typically represented by icons, and for user manipulation of those icons. One example of such a file manager is the "Finder" component of the Macintosh operating system sold by Apple Computer. In an exemplary embodiment of the present invention, a new operating system component—an Internet location manager—is added, and the file manager is modified to support the desired behaviors of the Internet location manager. Preferably, the file manager and the Internet locations manager communicate in a bidirectional fashion.

The function of the Internet location manager is to create Internet location objects, allow the desired behavior of the Internet location objects to be specified, and to help effectuate a desired behavior when an Internet location object is activated.

In an alternative embodiment, the functionality of creating and using Internet location objects may be divided between the Finder and an existing Internet control panel. In this embodiment, the Finder is solely responsible for creating Internet location objects. The Finder recognizes that a URL has been double clicked on and requests the Internet control panel to launch the correct application. The Internet control panel (or "Internet config") actually launches different applications depending on the type of URL.

In an exemplary embodiment, Internet location objects are files containing two resources, a "TEXT" resource and a "URL" resource. The "URL" resource always contains the URL as it will be presented to a browser or other program. The "TEXT" resource contains the original text used to create the Internet location object, and may be incomplete. For example, the "TEXT" resource might contain "apple.com" and the corresponding "URL" resource contain "http://apple.com." The text resource may also contain a more human readable form of the URL. For example, the "TEXT" resource might contain "http://Some organization. org" while the "URL" contains "http://Some%20organization.com."

Figure 2:
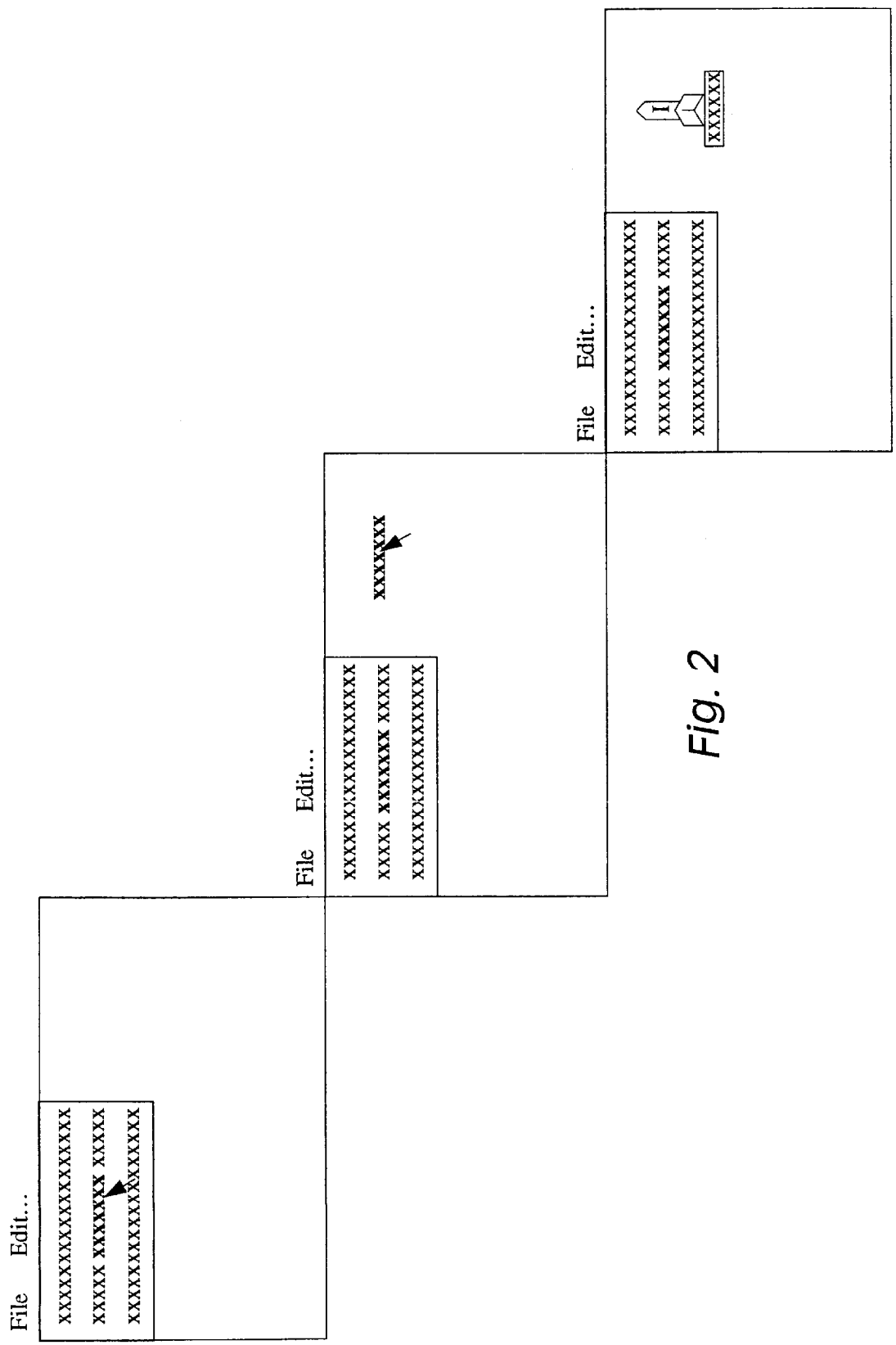
FIG. 2 is a sequence of simplified screen displays illustrating drag-and-drop creation of an Internet location object.

A preferred method of creating Internet location objects is provided that may be used regardless of program version. Referring to FIG. 2, text is selected by the user and is then "dragged and dropped" within the base window (i.e., onto the "desktop") of the GUI-based system. Such a drag-and-drop metaphor is commonly used to create "clippings," i.e., text selections that can be pasted into a document, e.g., using the same drag-and-drop action. Depending on the drag flavor, the file manager either causes an Internet location object (URL flavor) to be created directly or intelligently parses a text string that has been dragged and dropped onto the user desktop to determine whether the text string is likely a URL (text flavor). Parsing intelligence is incorporated into the Internet locations manager in order to distinguish likely Internet locations from ordinary clippings, as described more fully hereinafter. Assuming that the text is determined to be an Internet location, an Internet location object is created and represented by a distinctive icon placed on the desktop, for example. Associated with the icon is a default name, for example the text string itself or a portion thereof. The user may rename the Internet location object if desired, e.g., by doubling clicking on the name (not the icon). Once an icon has been created, it can be manipulated like any other icon—moved, copied, renamed, stored in a folder, removed, etc.

Alternatively, when the text is determined to be an Internet location, a dialog may be displayed, allowing the user to specify name, location and program in a manner similar to that described in the aforementioned patent.

Figure 3:
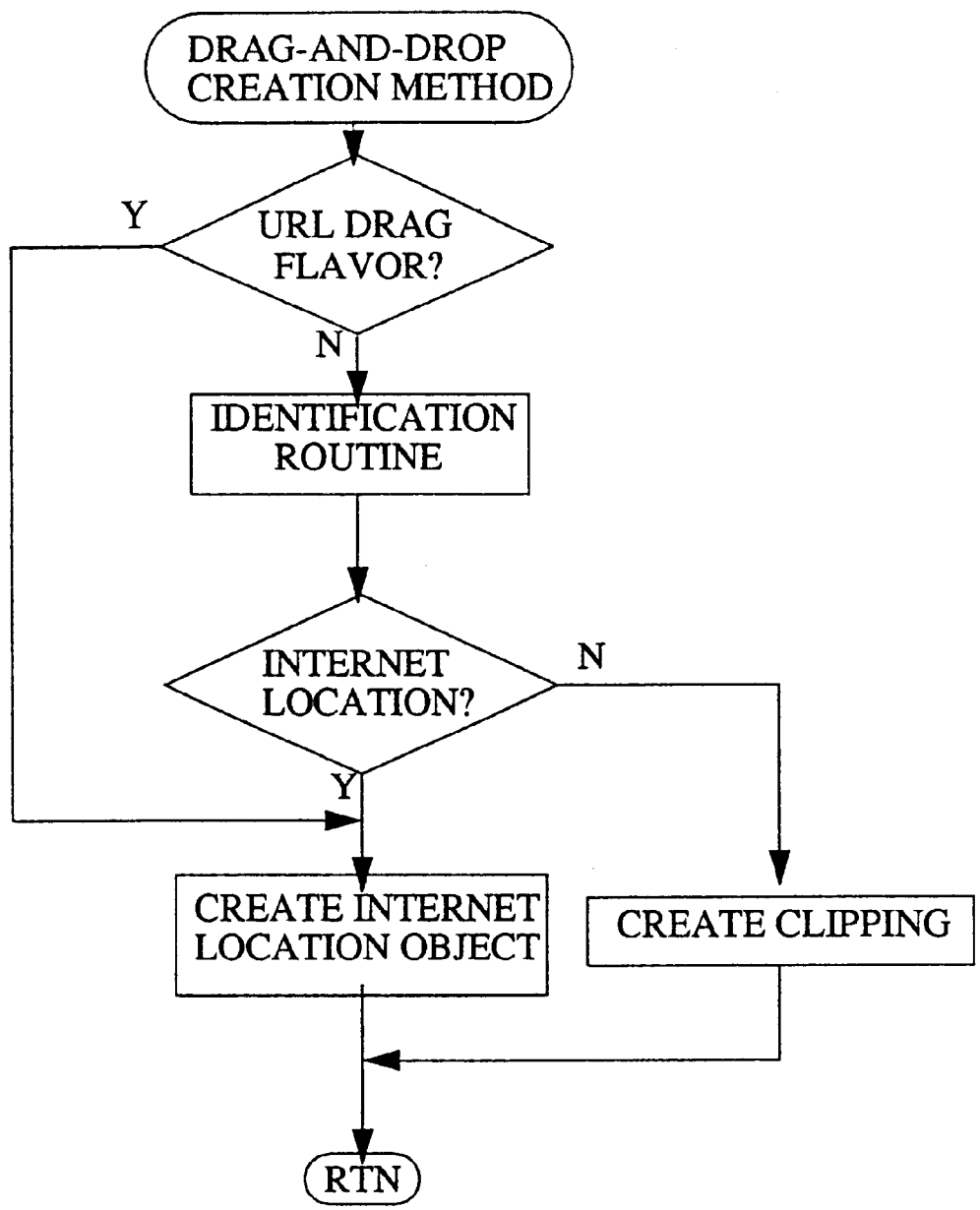
FIG. 3 is a flowchart of program steps performed in creating an Internet location object by the drag-and-drop method.
Figure 4:
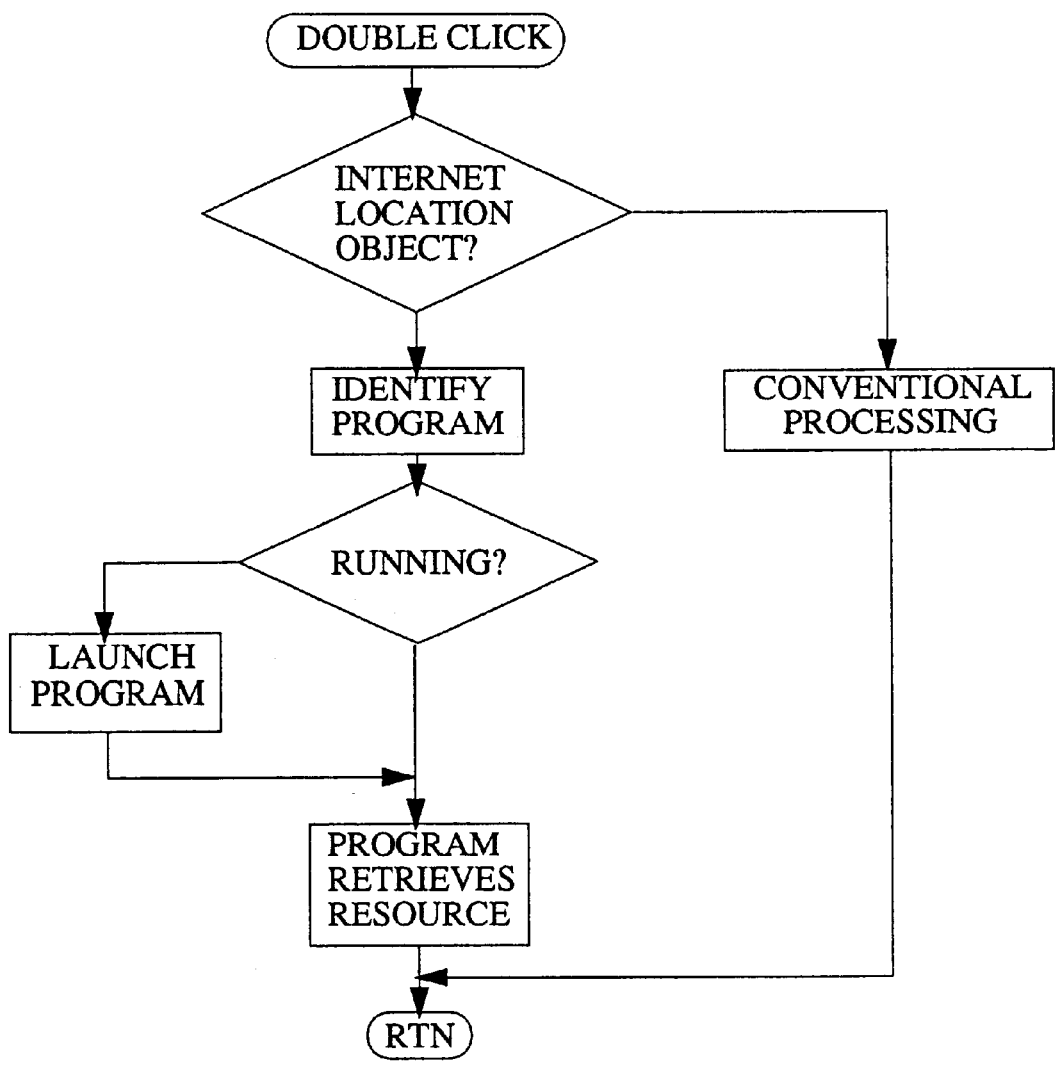
FIG. 4 is a flowchart of program steps performed in "opening" an Internet location object.

Flowcharts of program steps performed in creating an Internet location object by the drag-and-drop method and "opening" an Internet location object are shown in FIG. 3 and FIG. 4, respectively. Referring first to FIG. 3, in accordance with the drag-and-drop method of Internet location object creation, the file manager checks the drag flavor specified in the drag object received from an application. If the drag flavor is "URL," the file manager causes an Internet location object to be created directly. If the drag flavor is text, the file manager performs an identification routine. During the identification routine, the dropped text string is parsed, looking for certain "header" substrings (e.g, http://, ftp://, afp://, file://, mailto://, news:, at://, etc.), certain "subheader" strings (e.g, www., web., net., etc.), and certain "tail" substrings (e.g., .com, org, .edu, .mil, etc.). The headers afp:// and at:// are used in an Apple network browser to specify locations on a local area network (LAN).

The identification routine first looks for a header. If no header is found, then the identification routine looks for a suitable subheader, and if a subheader is found, looks for a tail. If a tail is found, then the text string is identified as a web location, and the string is completed with the header "http://." If no header is found and no subheader is found, then the identification routine looks for an e-mail address (e.g., foo@bar). If found, the string is completed with the "mailto:" header.

Although the foregoing heuristic has been found to give satisfactory results, the identification routine will result in some mis-identifications. In other embodiments, the identification routine may be customizable by the user to add and remove substrings from the preceding categories and/or to specify a desired "confidence level" for creating an Internet location object. The addition of headers, subheaders and tails may be provided for through an explicit interface or may be accomplished using familiar resource editing tools such as Resedit.

If desired, the same identification routine may be performed in a program whenever text is highlighted. If the text is identified as an Internet location, then an Internet location object may be immediately created using specified defaults or a dialog may be displayed, without requiring the user to drag the selected text to the desktop.

Referring again to FIG. 3, once the identification routine has been completed, if the text string was identified as an Internet location, then the file manager calls the Internet locations manager. If the text string was not identified as an Internet location, then a clipping may be created in the usual fashion, or some other behavior may occur.

Referring to FIG. 4, when an icon is double clicked, if it represents an Internet location object, then the program registered for that Internet location object, if it is not yet running, is caused to run. The program then "opens" the Internet location object and retrieves the resource identified by it. If the icon does not represent an Internet location object, then conventional processing ensues, depending on what the icon represents.

The association of programs to Internet location objects is done according to the type of Internet location. For example, through an interface to the Internet location manager, a user may specify that all Web locations (http://) open Microsoft Internet Explorer when double clicked or that e-mail addresses (bob@foo.net) open the Eudora mailer, or that network zones open a network browser.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A GUI-based computer system, comprising:

a CPU;

permanent storage coupled to the CPU;

an application having text and running on the CPU;

within permanent storage, an operating system, including an Internet location manager, the Internet location manager, in response to selecting and transferring text from the application to the operating system by a user, parsing the text to identify a text resource and a URL resource, creating an Internet location object, having both the text resource and the separate URL resource, representing an Internet resource retrievable from the computer system or a remote device, wherein the Internet location object, when activated, causes a program to retrieve said Internet resource from the appropriate device.

2. The apparatus of claim 1, wherein selecting and transferring the text is a drag-and-drop action involving text.

3. The apparatus of claim 2, wherein the file manager determines based on said text whether an Internet location object is to be created.

4. The apparatus of claim 3, wherein the file manager alters the text string to form a complete Internet location.

5. The apparatus of claim 4, wherein, if an Internet location object is not to be created then, at least some of the time, the file manager creates a clipping object that includes said text.

6. In a GUI-based computer system including system software, a method of creating from an application having text an Internet location object representing an Internet resource retrievable from the computer system or the remote device, the Internet location object, when activated, causing a program to retrieve said Internet resource, the method comprising the steps of:

a user selecting and transferring text from the application to the system software;

in response to the predetermined user action, system software parsing the text to identify a text resource and a URL resource, creating an Internet location object, having both the text resource and the separate URL resource, representing said Internet resource, the Internet location object, when activated, causing a program to retrieve said Internet resource from the appropriate device.

7. The method of claim 6, wherein selecting and transferring text is a drag-and-drop action involving text.

8. The method of claim 7, comprising the further step of determining based on said text whether an Internet location object is to be created.

9. The method of claim 8, comprising the further step of altering the text string to form a complete Internet location.

10. The apparatus of claim 9, wherein, if an Internet location object is not to be created then, at least some of the time, creating a clipping object that includes said text.

11. A computer-readable medium containing system software program instructions, including instructions for:

detecting the selection and transference of text from an application to the system software; and in response to transferring the text, system software parsing the text to identify a text resource and a URL resource, creating an Internet location object, having both the text resource and the separate URL resource, representing an Internet resource retrievable from the computer readable medium or a remote device, the Internet location object, when activated, causing a program to retrieve said Internet resource from the appropriate device.

12. The method of claim 11, wherein selecting and transferring text is a drag-and-drop action involving text.

13. The method of claim 12, further comprising instructions for determining based on said text whether an Internet location object is to be created.

14. The method of claim 11, further comprising instructions for altering the text string to form a complete Internet location.

15. The method of claim 14, wherein, if an Internet location object is not to be created then, at least some of the time, creating a clipping object that includes aid text.

* * * * *